United States Patent
Fujimoto et al.

(10) Patent No.: US 7,146,047 B2
(45) Date of Patent: Dec. 5, 2006

(54) IMAGE PROCESSING APPARATUS AND METHOD GENERATING BINARY IMAGE FROM A MULTILEVEL IMAGE

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1412 days.

(21) Appl. No.: 09/956,933

(22) Filed: Sep. 21, 2001

(65) Prior Publication Data

US 2006/0078204 A1    Apr. 13, 2006

(30) Foreign Application Priority Data

Jan. 11, 2001    (JP)    .............. 2001-003342

(51) Int. Cl.
*G06K 9/46*    (2006.01)
(52) U.S. Cl. ...................... 382/202; 382/203
(58) Field of Classification Search ............... 382/192, 382/195, 201–203, 270; 358/3.04
See application file for complete search history.

(56) References Cited

U.S. PATENT DOCUMENTS 6,195,468 B1 *  2/2001  Yoshida ..................... 382/270
6,972,873 B1 * 12/2005  Usui et al. ................. 358/3.04

FOREIGN PATENT DOCUMENTS

CN    1228502    9/1999

* cited by examiner

*Primary Examiner*—Vikkram Bali
(74) *Attorney, Agent, or Firm*—Staas & Halsey LLP

(57) ABSTRACT

An information processing apparatus extracts a plurality of strokes from a multilevel image, and generates a stroke binary image. Next, the image processing apparatus extracts feature amounts indicating the thickness and the smoothed graylevel of a stroke in a neighboring region of a target pixel by using each pixel belonging to each of the strokes as the target pixel. Then, the apparatus generates a target stroke binary image from the stroke binary image based on the distribution of the extracted feature amounts.

15 Claims, 17 Drawing Sheets

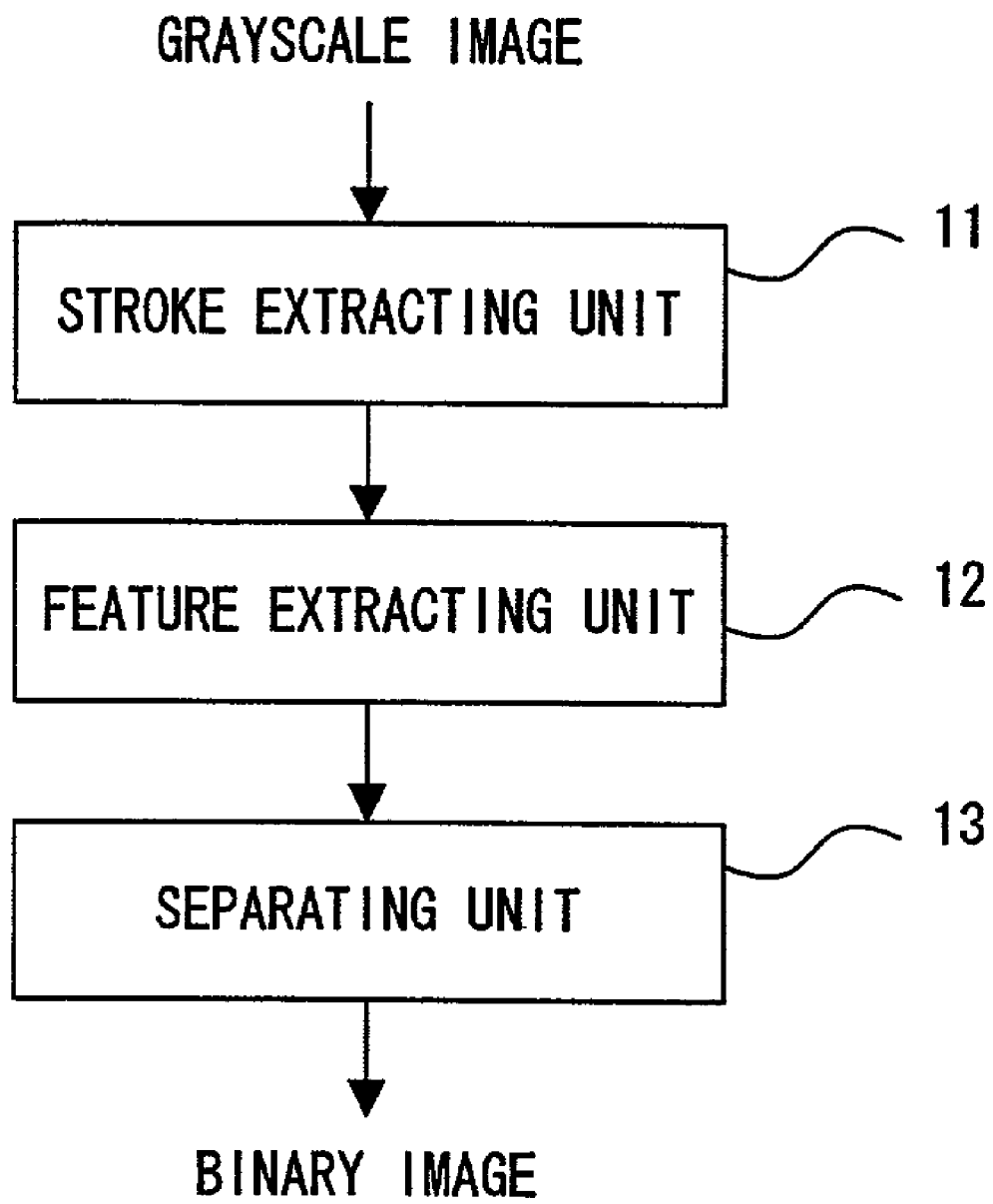
F I G. 1

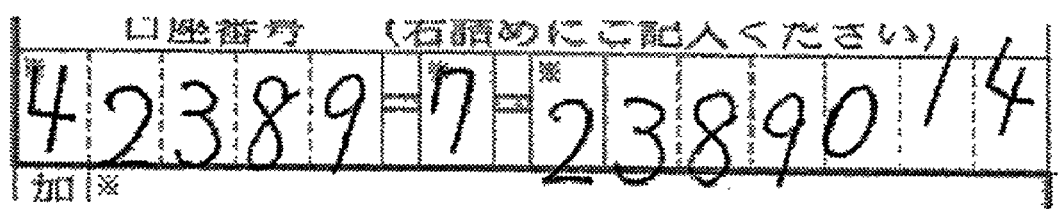
F I G. 2

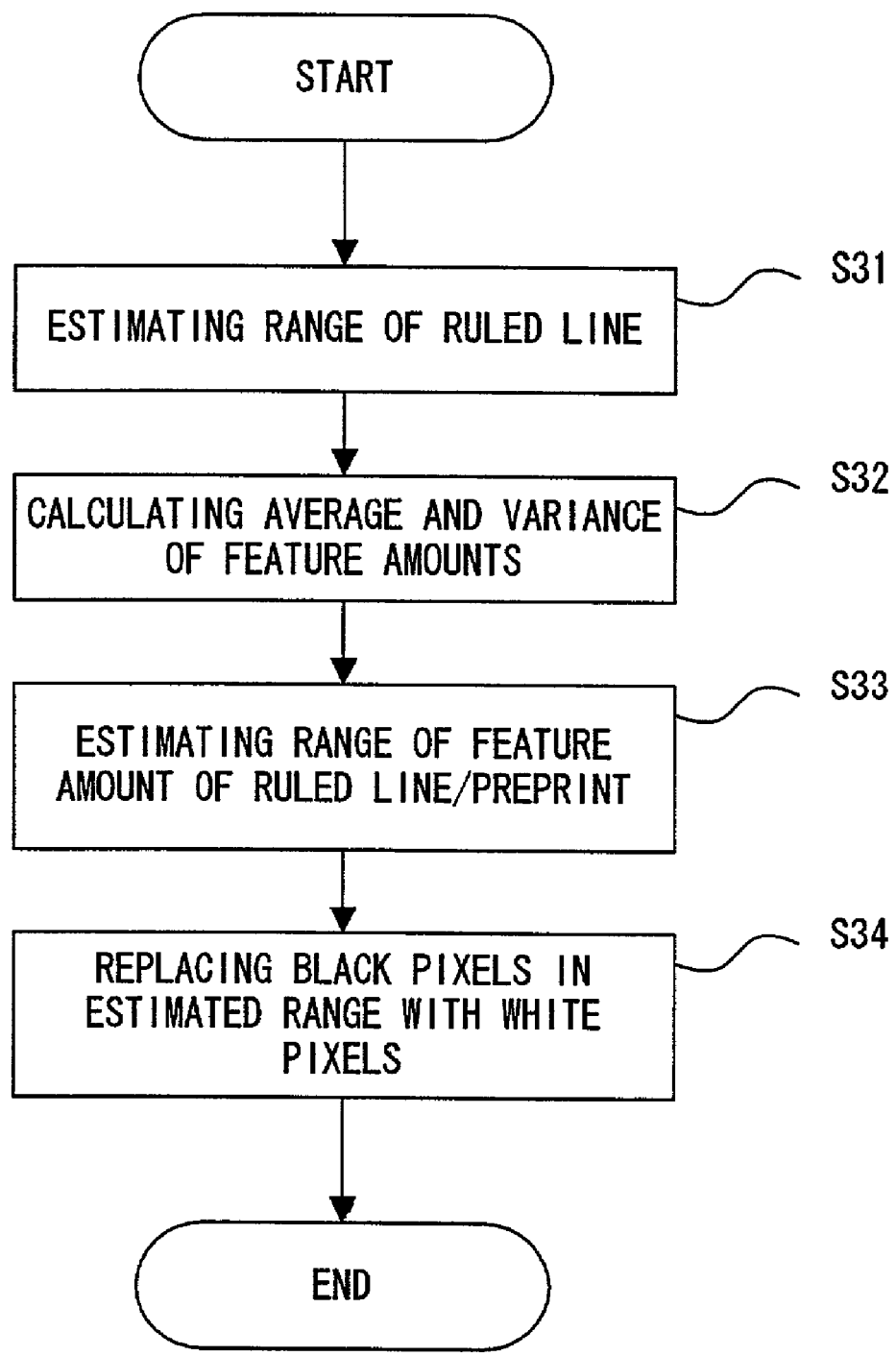
F I G. 1 1

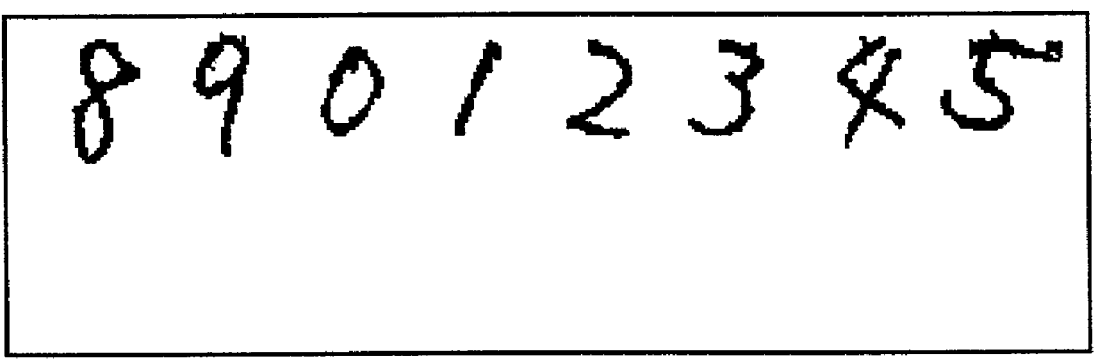
F I G. 1 5

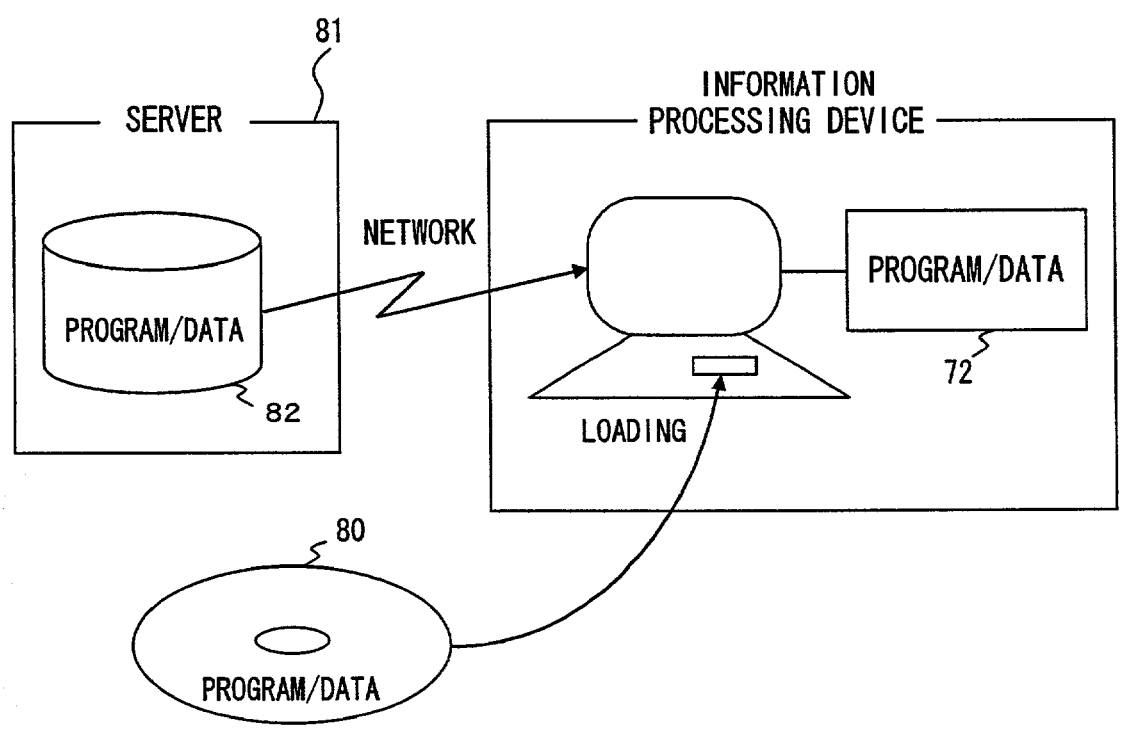
F I G. 1 7

IMAGE PROCESSING APPARATUS AND METHOD GENERATING BINARY IMAGE FROM A MULTILEVEL IMAGE

BACKGROUND OF THE INVENTION

1. Field of the Invention

The present invention relates to an image processing apparatus and method generating a binary image by processing a multilevel image.

2. Description of the Related Art

For conventional paper form recognition, strokes of handwritten characters, etc. are extracted from a grayscale image of an input paper form, and a recognition process is performed for the characters. A stroke corresponds to part of a pattern structuring a character or a ruled line, and is represented as a line pattern.

If a plurality of types of strokes such as a handwritten character, a ruled line, etc. coexist and contact within an input image, the differences among the strokes are distinguished based on the graylevels of pixels, and a stroke desired to be separated (a target stroke) is extracted.

However, if the graylevels of strokes of different types are almost the same, these strokes cannot be properly separated only with their graylevels. Furthermore, since the graylevels of pixels vary in an outline region corresponding to the boundary between a stroke and a background, a target stroke cannot be correctly detected even if the graylevels of strokes of different types are distinct.

SUMMARY OF THE INVENTION

An object of the present invention is to provide an image processing apparatus and method generating a binary image of a target stroke by separating, with high precision, the target stroke from a multilevel image such as a grayscale image, etc., in paper form or document recognition.

An image processing apparatus according to the present invention comprises an inputting device, a stroke extracting device, a feature extracting device, and a separating device.

The inputting device inputs a multilevel image. The stroke extracting device extracts a plurality of stroke regions from the multilevel image, and generates a binary image of the stroke regions. The feature extracting device extracts a feature amount based on the attribute of a different pixel included in a neighboring region of a target pixel by using each pixel in each stroke region as the target pixel. The separating device separates pixels belonging to a target stroke region from the binary image of the stroke regions by using the extracted feature amount of each pixel, and generates a binary image of the target stroke region.

A stroke region corresponds to a region where a line pattern of a stroke exists within a multilevel image, whereas the attribute of a pixel corresponds to the position of the pixel within a multilevel image, a correlation with an adjacent pixel, a graylevel value, etc.

The feature extracting device extracts a feature amount in consideration of the influence of a neighboring region by using not only the attribute of a target pixel itself but also the attribute of a different pixel in a neighboring region, and passes the extracted amount to the separating device. As such a feature amount, for example, information indicating the thickness of a stroke region in a neighboring region, or information indicating the smoothed graylevel of the stroke region in the neighboring region is used.

The separating device distinguishes between unnecessary pixels and pixels of a target stroke region by using the received feature amount, and classifies the pixels of the binary image of the stroke regions into two sets. Then, the separating device generates a binary image of the target stroke region by using only the set of the pixels of the target stroke region.

By using a feature amount for which the influence of a neighboring region is considered, the feature amounts of pixels belonging to strokes of the same type are made uniform, and the differences among the feature amounts of strokes of different types become definite. Accordingly, a target stroke can be correctly separated even if the graylevels of strokes of different types are almost the same, or even if the graylevels vary in an outline region of a stroke.

BRIEF DESCRIPTION OF THE DRAWINGS

FIG. 1 shows the configuration of an image processing apparatus;

FIG. 2 exemplifies a first grayscale image;

FIG. 4 exemplifies a first process result;

FIG. 11 is a flowchart showing a deletion process;

FIG. 15 exemplifies a second process result;

FIG. 17 shows storage media.

DESCRIPTION OF THE PREFERRED EMBODIMENTS

Hereinafter, a preferred embodiment according to the present invention will be explained in detail with reference to the drawings.

FIG. 1 shows the configuration of an image processing apparatus according to a preferred embodiment. The image processing apparatus shown in FIG. 1 comprises a stroke extracting unit 11, a feature extracting unit 12, and a separating unit 13. This apparatus generates a binary image by extracting a handwritten character included in a grayscale image input from a scanner.

FIG. 2 exemplifies an input grayscale image. The grayscale image shown in FIG. 2 includes ruled lines and preprints in addition to handwritten characters, which contact the ruled lines and preprints. The preprints correspond to preprinted information such as a mark "※" or characters of a note. The image processing apparatus obtains the graylevel feature amount and the thickness feature amount of each pixel, also obtains the ranges of the feature amounts of ruled line/preprint pixels to be deleted, and makes high-quality extraction for the contacting letters.

Figure 3:
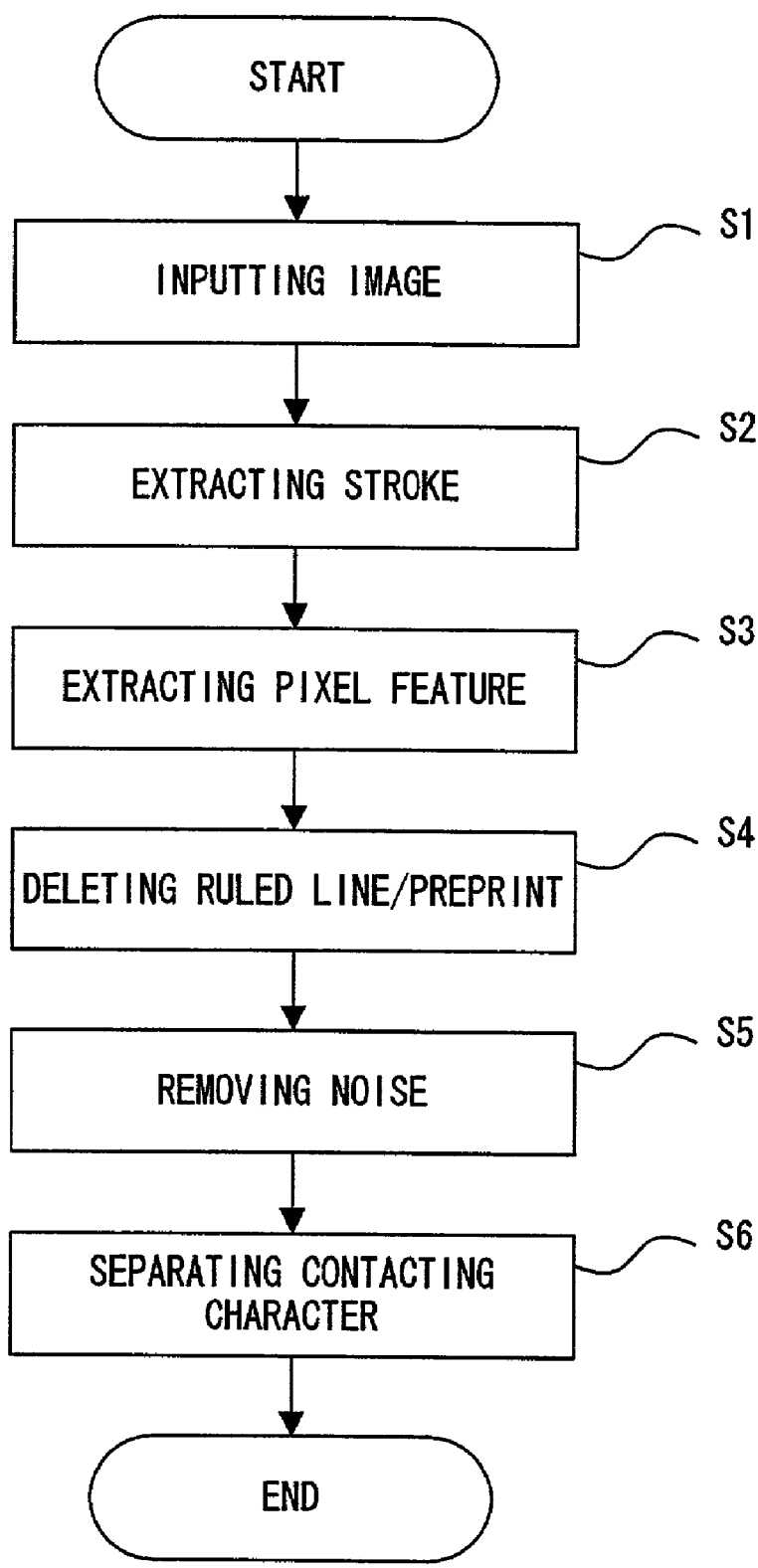
FIG. 3 is a flowchart showing a binarization process.
Figure 5:
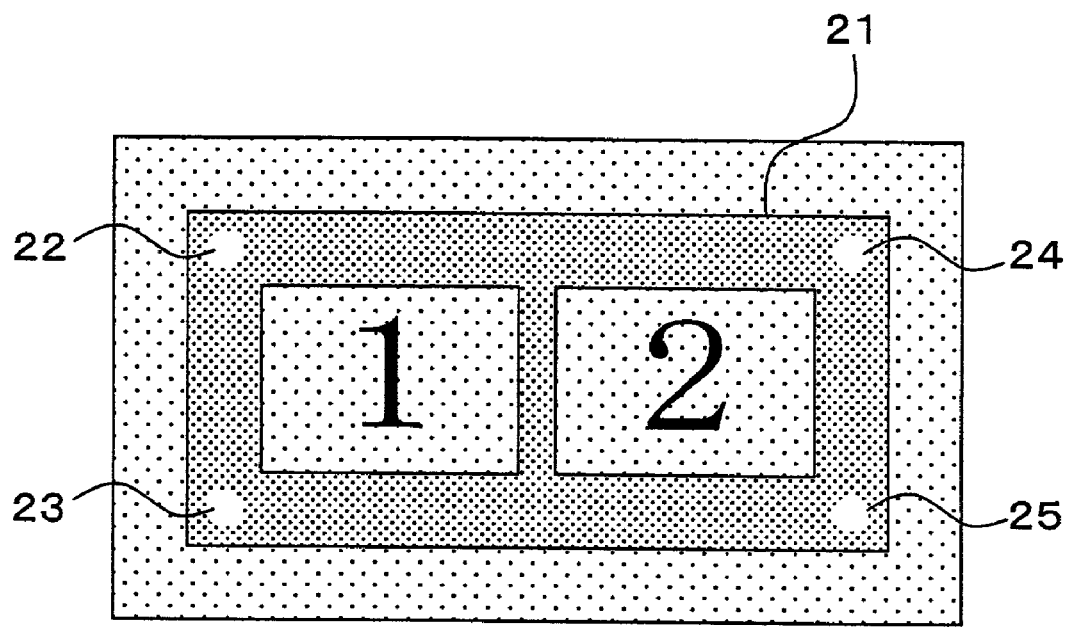
FIG. 5 exemplifies a ruled line frame.

FIG. 3 is a flowchart showing the binarization process performed by the image processing apparatus shown in FIG. 1. Firstly, the image processing apparatus inputs a grayscale image to be processed (step S1). Next, the stroke extracting unit 11 extracts a stroke from the input image, and generates a stroke binary image (step S2). Then, the feature extracting unit 12 extracts the graylevel feature amount and the thickness feature amount of each pixel within the stroke binary image, and generates a two-dimensional pixel feature composed of the two feature amounts (step S3).

Next, the separating unit 13 deletes ruled line and preprint pixels from the stroke binary image (step S4). At this time, the separating unit 13 obtains the averages and standard deviations of the feature amounts of thin and thick ruled lines by using the coordinates of a recognition frame specified in the grayscale image, and estimates the ranges of the two-dimensional pixel features of the thin (including a preprint) and thick lines. The separating unit 13 then deletes pixels having the feature amounts within the estimated ranges.

Next, the separating unit 13 removes noise (step S5), and separates contacting characters from the ruled line (step S6). At this time, the binarization process is again performed for a black pixel region contacting the thick ruled line in units of pixels without smoothing, so that a line pattern having a smooth outline is obtained. The obtained line pattern is output as a target stroke.

Figure 4:
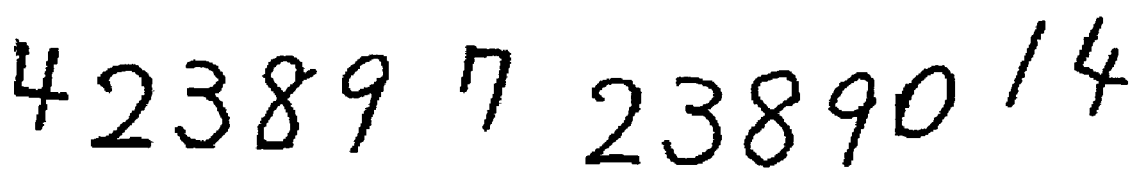

For example, a target stroke binary image composed of handwritten characters shown in FIG. 4 is generated from the grayscale image shown in FIG. 2. The generated target stroke binary image is used as a character recognition target in a succeeding process.

Next, the binarization process shown in FIG. 3 is further explained in detail with reference to FIGS. 5 through 15.

Input information for the binarization process are a grayscale image to be processed and the coordinates of a recognition frame. The grayscale image is represented by a multilevel image of 256 graylevels, which is captured by a scanner. In this case, 256 values from 0 (black) to 255 (white) are used as the graylevels of pixels.

Furthermore, the coordinates of a recognition frame are represented by coordinate values that represent the position of a ruled line frame within an image. By way of example, for the grayscale image shown in FIG. 5, a ruled line frame 21 is used as a recognition frame, and coordinate values of points 22, 23, 24 and 25 at the four corners of the frame are specified as the coordinates of the recognition frame. If a ruled line has a width of several dots, the coordinates of the position that is the center of the width are specified.

A ruled line frame represents a region where a character string to be extracted is expected to exist. However, a character pattern can possibly protrude from a ruled line frame, and contact the ruled line. Therefore, all character string patterns do not always need to exist within a ruled line frame.

In step S2 of FIG. 3, a stroke binary image is generated from a grayscale image, for example, with any of the following binarization processes. Which of the binarization processes is used may be predetermined. Or, a user may select one of the processes.
(1) Global binarization using a single threshold value, like Otsu binarization.
(2) Local binarization using a different threshold value for each pixel within an image, like Niblack binarization.
(3) Local binarization based on background distinguishment using a standard deviation, which is recited in a Japanese patent application "Image Processing Apparatus and Image Processing Method" (Japanese Patent Application No. 11-335495).

Characters, ruled lines and preprints coexist as strokes within a stroke binary image, and also strokes are in contact with one another. Assuming that the long direction (longitudinal direction) of a line pattern representing one stroke is the direction of a stroke, and a short direction is a direction perpendicular to the stroke, the width of the stroke in the direction perpendicular to the stroke corresponds to the thickness of the stroke.

Figure 6:
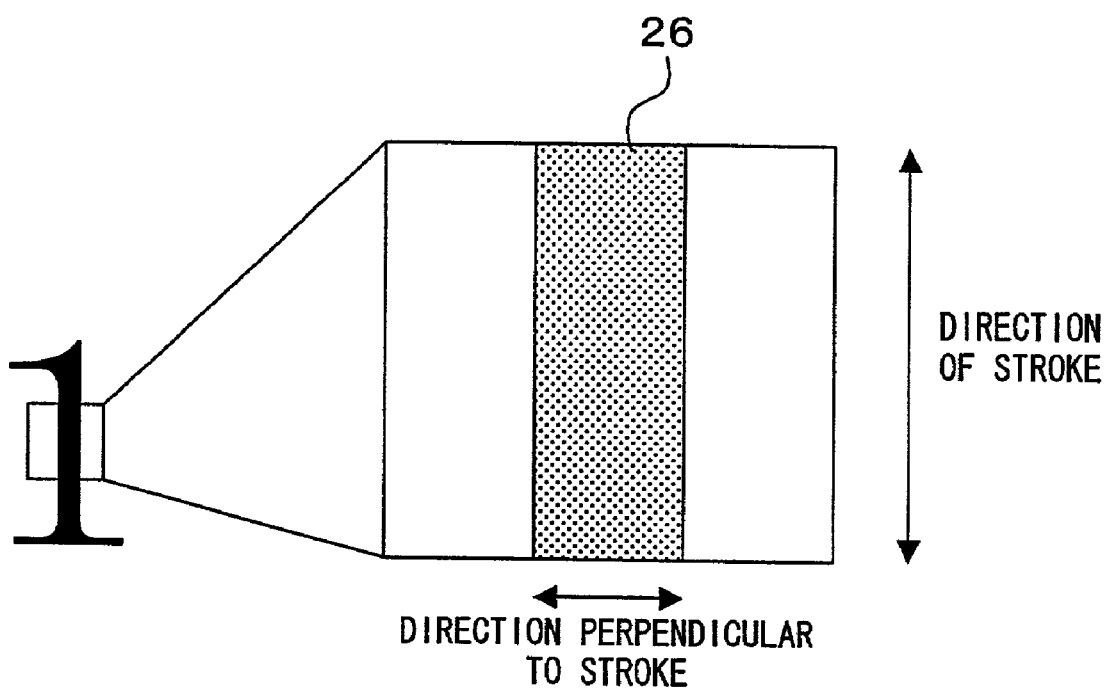
FIG. 6 exemplifies a stroke.

By way of example, for a stroke 26 structuring the numeral shown in FIG. 6, the vertical direction corresponds to the direction of the stroke, whereas the horizontal direction corresponds to the direction perpendicular to the stroke. Namely, the width in the horizontal direction corresponds to the thickness of the stroke.

In a stroke binary image, a stroke other than a stroke within a ruled line frame specified within the image and a stroke contacting the ruled line frame is unnecessary. Accordingly, a concatenation component of black pixels, which exists only outside a ruled line frame, is removed.

Furthermore, in step S3 of FIG. 3, the thickness feature amount and the graylevel feature amount are extracted for each pixel. Firstly, the feature extracting unit 12 targets each of black pixels (pixels regarded as a stroke) in a stroke binary image, and extracts the thickness of a stroke in the neighborhood of each target pixel as the thickness feature amount of the target pixel.

Figure 7:
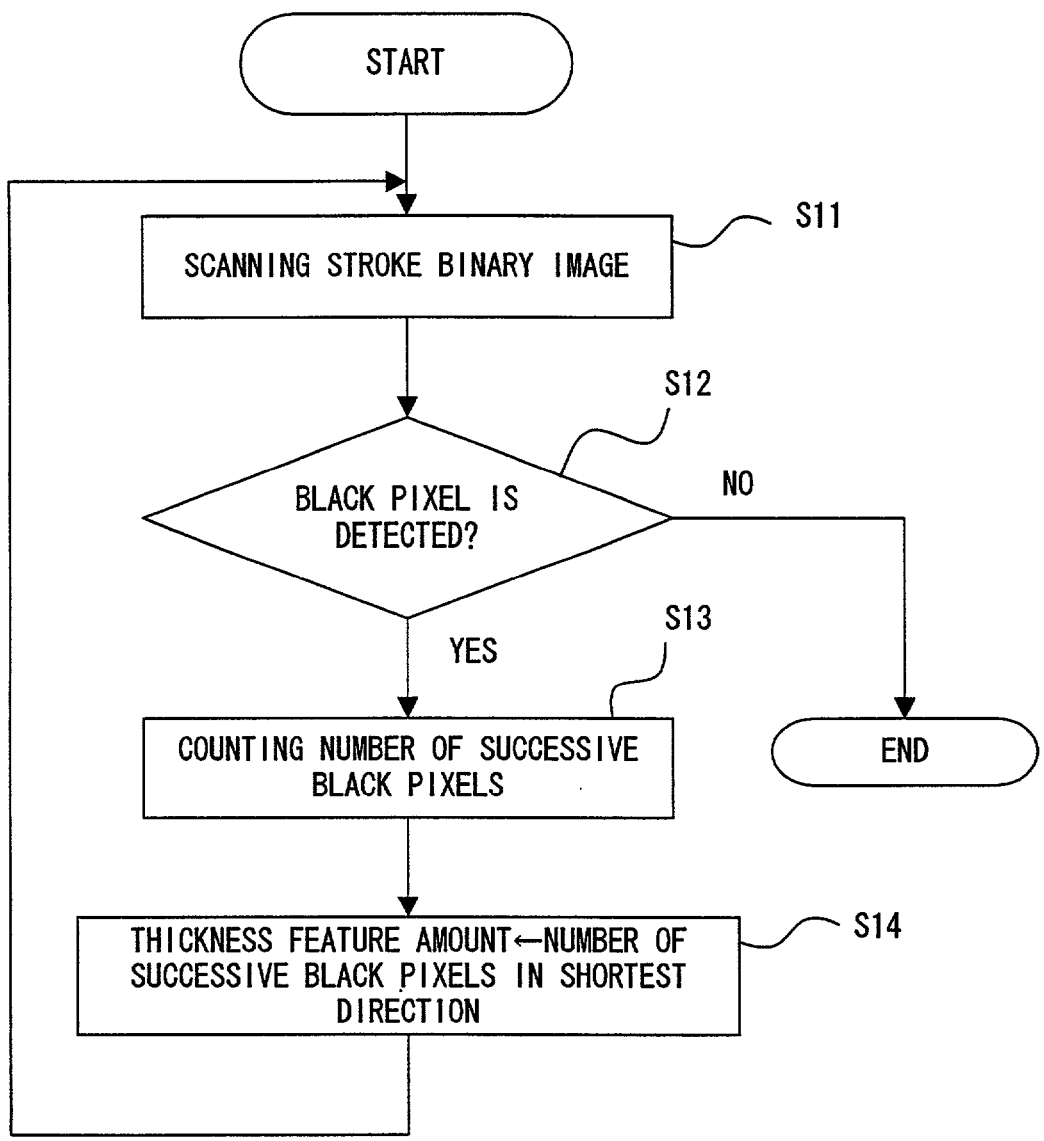
FIG. 7 is a flowchart showing a thickness feature amount extraction process.
Figure 8:
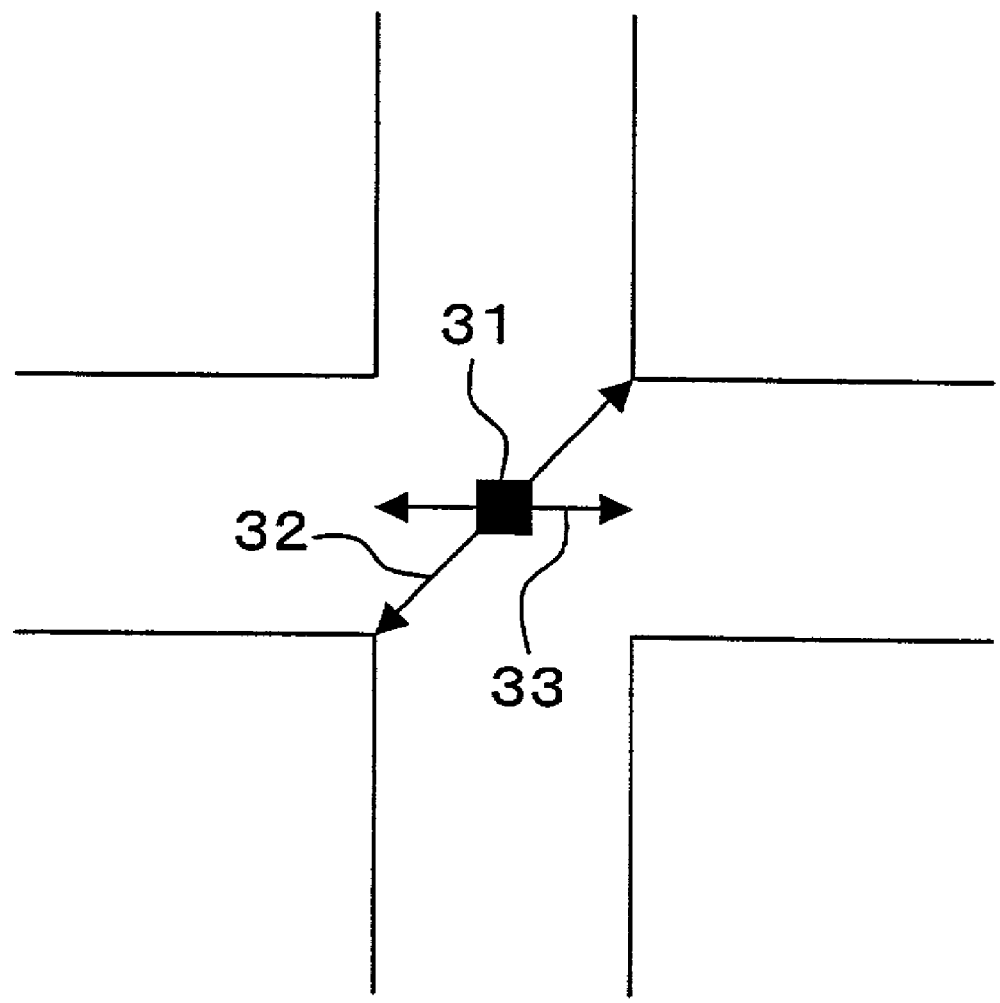
FIG. 8 shows an intersection.

FIG. 7 is a flowchart showing a thickness feature amount extraction process. The feature extracting unit 12 first scans a stroke binary image (step S11), and searches for a black pixel (step S12). Upon detection of a black pixel, another black pixel starts to be searched from the position of the detected black pixel by using the detected pixel as a target pixel, and whether or not an adjacent pixel is a black pixel is repeatedly determined (step S13). Such a search is made in 8 directions such as the left, the right, the upward, the downward, and oblique directions, and the numbers of successive black pixels in the 4 directions such as the vertical, the horizontal, and the oblique directions are counted.

Then, the number of successive black pixels in the shortest direction among the count results (the minimum of the numbers of successive pixels) is defined to be the thickness feature amount of a stroke at a target pixel (step S14). For pixels of a square, however, the ratio of the vertical/horizontal length to the length of a diagonal line is 1 to $2^{1/2}$. Therefore, the number of successive black pixels in the oblique direction is multiplied by $2^{1/2}$ with respect to the number of successive black pixels in the vertical/horizontal direction. This multiplication is performed to obtain the thickness corresponding not to the number of pixels, but to an actual distance.

Although this calculation method is suitable for obtaining the thickness of a stroke in a simple oblique direction, it is unsuitable for obtaining the thickness of an intersection of strokes. At the intersection of strokes shown in FIG. 8, not a length 32 in the shortest oblique direction, but a length 33 in the horizontal direction corresponds to the thickness of an actual stroke with respect to the target pixel 31. Accordingly, the number of successive black pixels in the oblique direction is used unchanged as a thickness feature amount at a point expected to be an intersection, without being multiplied by $2^{1/2}$.

Next, the feature extracting unit 12 repeats the operations in and after step S11 to obtain the thickness feature amounts at the positions of different black pixels. If no more black pixel yet to be processed is left in step S12, the process is terminated.

Figure 9:
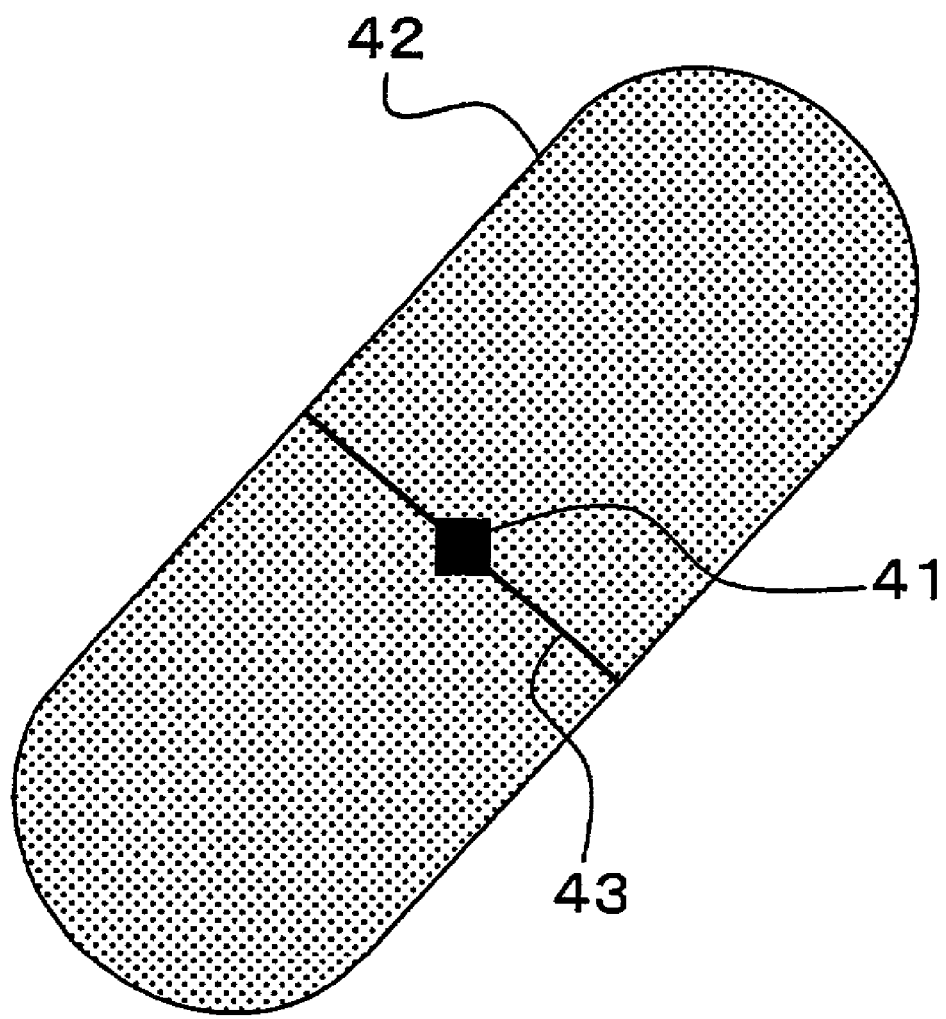
FIG. 9 shows a cutting line.

In the above described steps S13 and S14, the thickness may be obtained by using the difference between the graylevel of a stroke and that of a background in the original grayscale image, instead of the number of successive black pixels. In this case, as shown in FIG. 9, the feature extracting unit 12 sets a cutting line 43, which passes through a target pixel 41 and cuts a stroke 42 in the neighboring region of the target pixel 41 in the direction perpendicular to the stroke 42. Then, the difference between the graylevel of each pixel in the cutting line 43 and that of the background is obtained, and the value obtained by dividing the sum of graylevel differences by a maximum graylevel difference is defined to be a thickness feature amount. This value corresponds to the information indicating the length of the cutting line 43.

Assuming that the graylevel difference of an i-th pixel in the cutting line 43 is Δgi, its thickness feature amount F is calculated by the following equation.

$$F = \frac{\sum_i \Delta gi}{\max_i \Delta gi}$$

By defining the ratio of the sum of graylevel differences between a stroke and a background to a particular graylevel difference to be the thickness of the stroke at the position of a target pixel as described above, an influence of interpolation at the time of scanner capturing can be reduced at the boundary between the stroke and the background.

Next, the feature extracting unit 12 extracts the graylevel of a neighboring stroke of a target black pixel as the graylevel feature amount of the target black pixel by targeting each of the black pixels within the stroke binary image.

Figure 10:
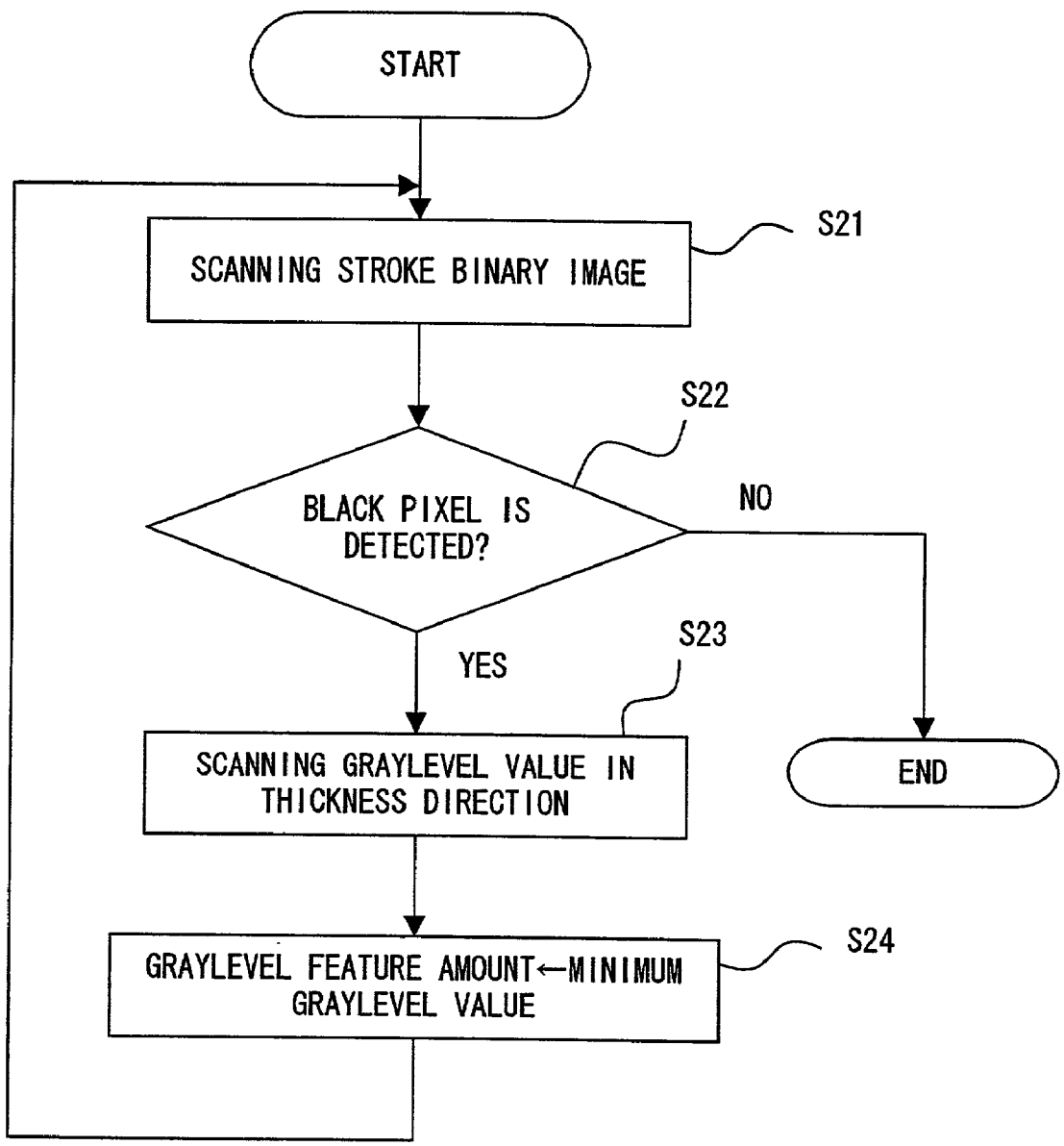
FIG. 10 is a flowchart showing a graylevel feature amount extraction process.

FIG. 10 is a flowchart showing a graylevel feature amount extraction process. The feature extracting unit 12 scans a stroke binary image (step S21), and searches for a black pixel (step S22). Upon detection of a black pixel, the graylevel values of pixels are scanned in the direction (thickness direction) that passes through the black pixel, which is used as a target pixel, and is perpendicular to the stroke (step S23). Then, the smallest value (the graylevel value closest to black) is searched, and the searched value is defined to be the graylevel feature amount of the stroke at the position of the target pixel (step S24).

By using such a graylevel feature amount, the graylevel of a stroke is smoothed by the minimum value in the thickness direction. Accordingly, the graylevel feature amounts of pixels belonging to the strokes of the same type can be prevented from varying, even if the graylevels of these pixels vary due to the fluctuations of the graylevel of the outline of the stroke. Similar smoothing is performed also when the average of graylevel values in the thickness direction is used as a graylevel feature amount instead of the minimum graylevel value in this direction.

Furthermore, if the graylevel of an outline region does not vary much, the graylevel value of a target pixel itself may be used as a graylevel feature amount instead of such a smoothed graylevel value.

Furthermore, in step S4 of FIG. 3, the separating unit 13 estimates the ranges of the feature amounts of pixels belonging to the ruled line stroke and the preprint stroke, and deletes pixels having the feature amounts within the estimated ranges from the stroke binary image.

FIG. 11 is a flowchart showing such a deletion process. The separating unit 13 first estimates the range of a ruled line within an image from the given coordinates of a ruled line frame, which are provided as input information (step S31). Normally, the width of a ruled line within an image is indefinite. Therefore, it is necessary to estimate the range of pixels that correspond to a ruled line.

Next, an average and a variance of each of the thickness and the graylevel feature amounts are obtained for the pixels in the estimated ruled line (step S32). Then, the obtained average value is defined to be a center value, a range having a width obtained by multiplying the variance by a suitable coefficient is defined to be the range of the feature amount of the pixels belonging to the ruled line, and the ranges of the thickness and the graylevel feature amounts are merged and defined as the range of a two-dimensional pixel feature (step S33). At this time, the range of a feature amount is estimated separately for each of thin and thick ruled lines, and the range of the feature amount of a preprint is recognized to be the same as that of the feature amount of the thin ruled line.

Figure 12:
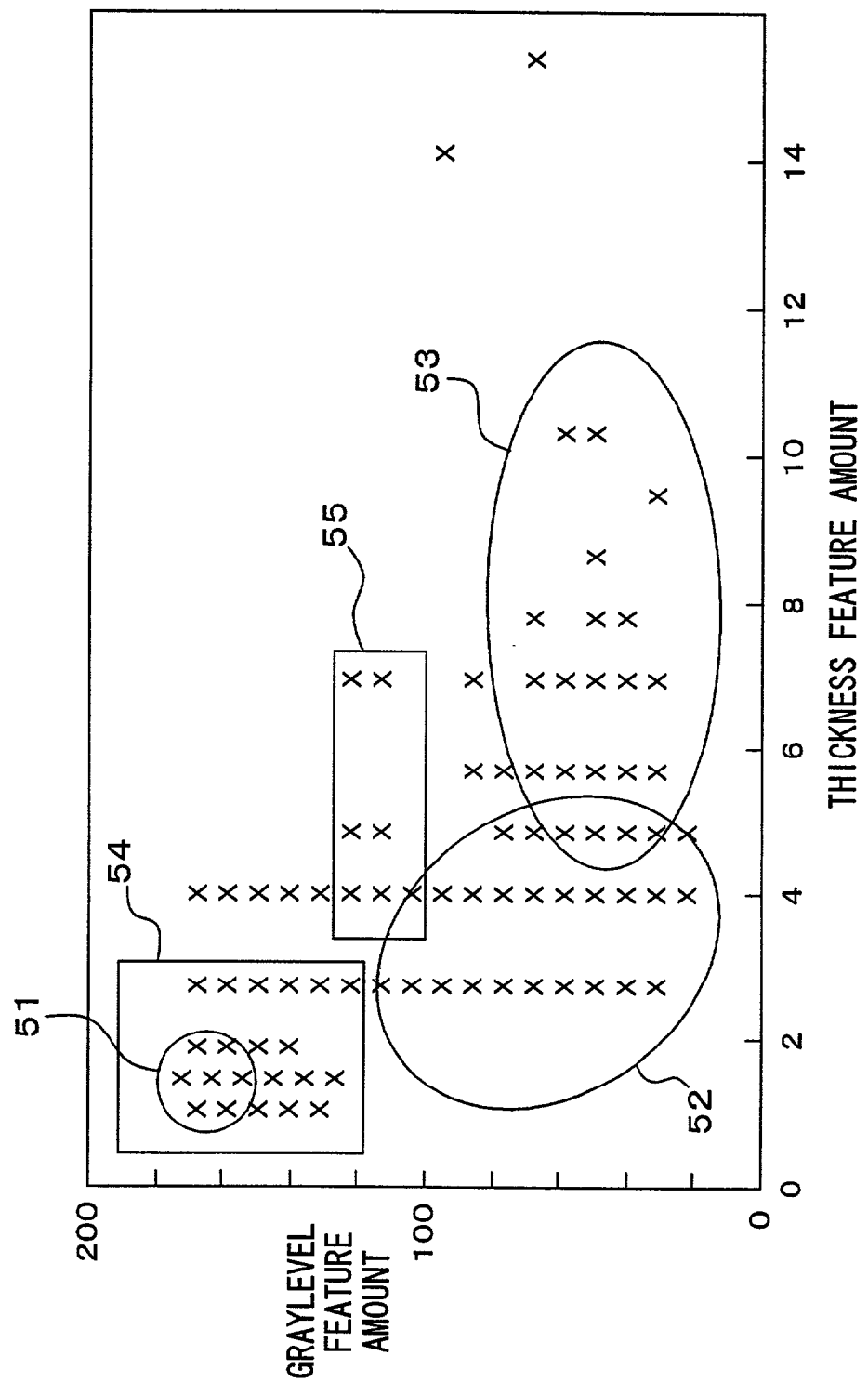
FIG. 12 exemplifies the distribution of a two-dimensional image feature.

Here, if points whose coordinate values are the thickness and the graylevel feature amounts of black pixels within a stroke binary image are plotted on a plane, for example, a distribution of a two-dimensional pixel feature shown in FIG. 12 is obtained. In this figure, regions 51, 52, and 53 respectively correspond to preprint pixels, pixels of a handwritten character, and pixels in a region (contact region) where a character and a ruled line contact. Furthermore, regions 54 and 55 respectively correspond to the ranges of two-dimensional pixel features of the thin and thick ruled lines.

Next, the separating unit 13 replaces the black pixels belonging to the range of the two-dimensional pixel feature of the thin or the thick ruled line among the black pixels within the stroke binary image with white pixels (background pixels). As a result, the ruled lines are deleted, and also the preprint is deleted along with the thin ruled line.

In the above described step S33, a set of target stroke pixels may be separated from the distribution of the two-dimensional pixel feature by means of clustering. In this case, the separating unit 13 divides the distribution of the two-dimensional pixel feature into a plurality of distributions with clustering, and characterizes the shapes of the distributions by obtaining the average and the standard deviation of each of the distributions.

Next, the set of obtained distributions is classified into a distribution of pixels of characters and contact regions, which are desired to be extracted, and a distribution of pixels of ruled lines and preprints, which are desired to be deleted. As a classification method, a method classifying a distribution set based on the correlation between parameters such as the average of each distribution, a standard deviation, etc., a method defining a distribution close to the feature of pixels belonging to a ruled line frame as a distribution to be deleted is used.

If pixels are not of a handwritten character component although they cannot be deleted with such a deletion process as pixels belonging to the range of the two-dimensional pixel feature of a ruled line/preprint, they must be deleted. Therefore, in step S5 of FIG. 3, the separating unit 13 removes a black pixel concatenation component having a small size and a small number of pixels as noise from the stroke binary image from which the ruled line/preprint pixels are deleted.

Figure 13:
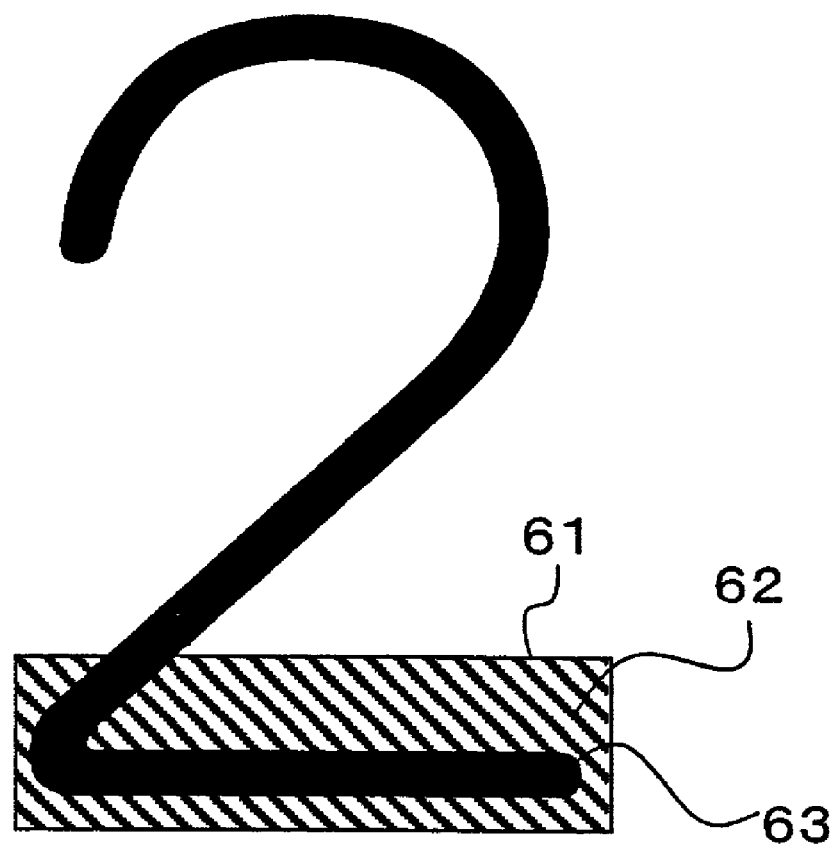
FIG. 13 exemplifies a contacting character.

Furthermore, the feature amount of pixels belonging to the neighborhood of a region where a handwritten character contacts a ruled line deviates from the range of the feature amount to be removed due to smoothing performed in the direction perpendicular to the stroke of the character. As a result, a rectangular region 61 that is not removed with the operation of step S4 is left as shown in FIG. 13.

Accordingly, in step S6 of FIG. 3, the separating unit 13 again performs the binarization process within the rectangular region 61 of the grayscale image. At this time, the binarization process is performed for each line in the direction of the ruled line so that the pixels are classified into two types such as pixels belonging only to a ruled line 62, and pixels of an image (contact image) 63 where the ruled line and the handwritten character contact. Then, the pixels within the stroke binary image, which correspond only to the pixels of the ruled line 62, are removed. Consequently, the handwritten character and the ruled line are separated, whereby a high-quality pattern of the handwritten character can be obtained.

Figure 14:
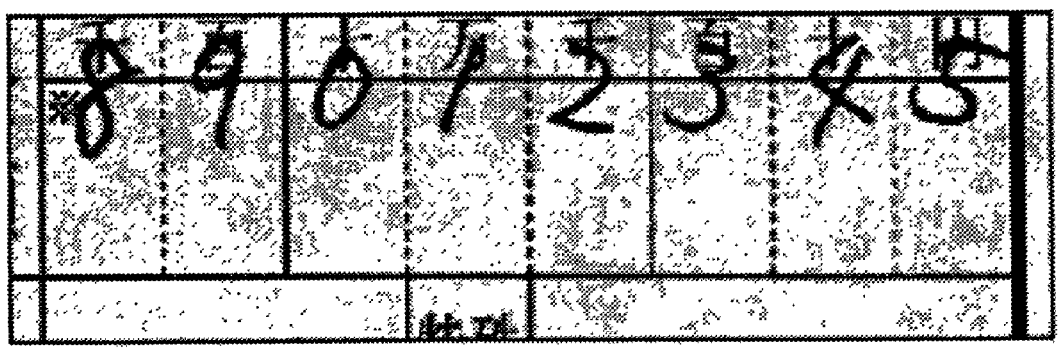
FIG. 14 exemplifies a second grayscale image.

With the above described process, a pattern of a handwritten character can be extracted with high precision from a grayscale image of poor-quality handwritten characters shown in FIG. 14, like a process result shown in FIG. 15.

The above described preferred embodiment mainly adopts the grayscale images as process targets. According to the present invention, however, an arbitrary multilevel image including a color image may be available as a process target. Furthermore, a target stroke may not be a handwritten character, and corresponds to a stroke of an arbitrary pattern desired to be separated, such as a printed or typed character.

Figure 16:
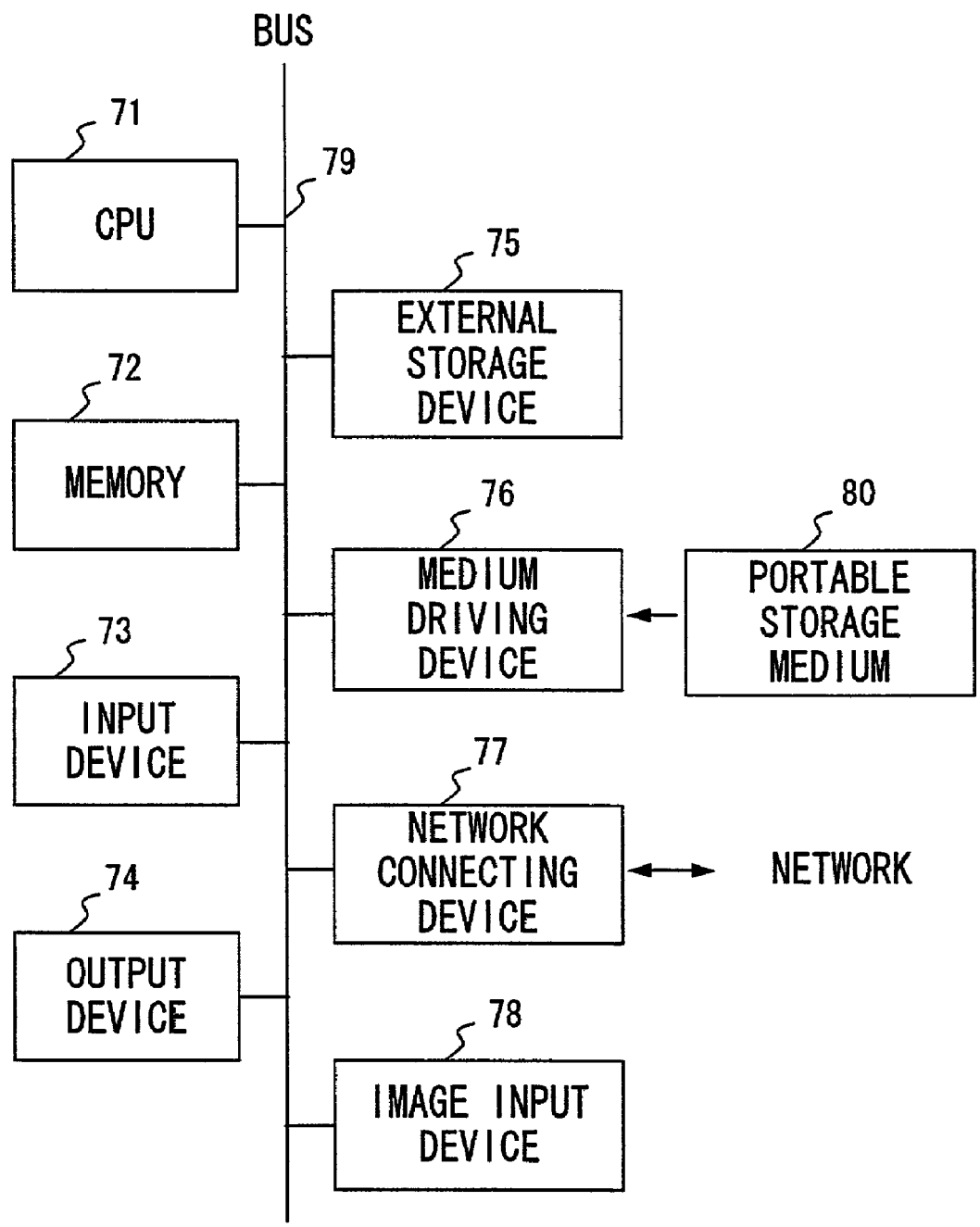
FIG. 16 shows the configuration of an information processing device.

The image processing apparatus shown in FIG. 1 is configured, for example, by an information processing device (computer) shown in FIG. 16. The information processing device shown in FIG. 16 comprises a CPU (Central Processing Unit) 71, a memory 72, an input device 73, an output device 74, an external storage device 75, a medium driving device 76, a network connecting device 77, and an image input device 78, which are interconnected by a bus 79.

The memory 72 includes, for example, a ROM (Read Only Memory), a RAM (Random Access Memory), etc., and stores a program and data, which are used for processes. The CPU 71 performs necessary processes by executing the program with the use of the memory 72. The stroke extracting unit 11, the feature extracting unit 12, and the separating unit 13, which are shown in FIG. 1, correspond to software components described by the program, and stored in the memory 72.

The input device 73 is, for example, a keyboard, a pointing device, a touch panel, etc., and is used to input an instruction or information from a user. The output device 74 is, for example, a display, a printer, a speaker, etc., and is used to output an inquiry to a user or a process result.

The external storage device 75 is, for example, a magnetic disk device, an optical disk device, a magneto-optical disk device, a tape device, etc. The information processing device stores the above described program and data in the external storage medium 75, and uses the program and data by loading them into the memory 72 on demand.

The medium driving device 76 drives a portable storage medium 80, and accesses its stored contents. As the portable storage medium 80, an arbitrary computer-readable storage medium such as a memory card, a floppy disk, a CD-ROM (Compact Disk-Read Only Memory), an optical disk, a magneto-optical disk, etc. is used. A user stores the above described program and data onto the portable storage medium 80, and uses the program and data by loading them into the memory 72 on demand.

The network connecting device 77 is connected to an arbitrary communications network such as a LAN (Local Area Network), etc., and performs data conversion accompanying a communication. Furthermore, the information processing device receives the above described program and data from a different device such as a server, etc. via the network connecting device 77, and uses the program and data by loading them into the memory 72 on demand.

The image input device 78 corresponds, for example, to a scanner, and inputs a multilevel image to be processed to the memory 72.

FIG. 17 shows computer-readable storage media that can provide the information processing device shown in FIG. 16 with a program and data. The program and data stored onto the portable storage medium 80 or in a database 82 of a server 81 are loaded into the memory 72. At this time, the server 81 generates a propagation signal for propagating the program and data, and transmits the signal to the information processing device via an arbitrary transmission medium in a network. The CPU 71 then executes the program with the data, and performs necessary processes.

According to the present invention, information indicating the thickness or the smoothed graylevel of a stroke in the neighborhood of a pixel is used as a feature amount of each pixel within a stroke region, whereby a target stroke can be separated even if the graylevels of strokes of different types are almost the same. Additionally, by using such a feature amount, pixels belonging to a stroke can be clearly distinguished even when a graylevel varies in the outline region of the stroke. As a result, a target stroke can be properly separated without being influenced by the outline region.

What is claimed is:

1. An image processing apparatus, comprising:
   an inputting device inputting a multilevel image;
   a stroke extracting device extracting a plurality of stroke regions from the multilevel image, and generating a binary image of the plurality of stroke regions;
   a feature extracting device extracting a feature amount based on an attribute of a different pixel included in a neighboring region of a target pixel by using each pixel in each of the plurality of stroke regions as the target pixel; and
   a separating device separating pixels belonging to a target stroke region from the binary image of the plurality of stroke regions by using the extracted feature amount of each pixel, and generating a binary image of the target stroke region.

2. The image processing apparatus according to claim 1, wherein
   said stroke extracting device generates the binary image of the plurality of stroke regions by using at least one of a global binarization process using a single threshold value and a local binarization process using a different threshold value for each pixel within an image.

3. The image processing apparatus according to claim 1, wherein
   said feature extracting device extracts, as feature amounts, information indicating a thickness of a stroke region in the neighboring region, and information indicating a smoothed graylevel of the stroke region in the neighboring region.

4. The image processing apparatus according to claim 1, wherein
   said feature extracting device extracts, as the feature amount, information indicating a thickness of a stroke region in the neighboring region.

5. The information processing apparatus according to claim 4, wherein
   said feature extracting device extracts, as the information indicating the thickness, information indicating a length in a shortest direction among a length of the stroke region in the neighboring region in a vertical direction, a length in a horizontal direction, and a length in an oblique direction.

6. The image processing apparatus according to claim 4, wherein said feature extracting device extracts, as the information indicating the thickness, information indicating a length of a cutting line that passes through the target pixel and cuts the stroke region in the neighboring region in a direction perpendicular to the stroke region.

7. The image processing apparatus according to claim 6, wherein said feature extracting device obtains a difference between a graylevel of each pixel in the cutting line and a graylevel of a background, and extracts, as the information indicating the thickness, a value obtained by dividing a sum of graylevel differences by a maximum graylevel difference.

8. The image processing apparatus according to claim 1, wherein said feature extracting device extracts, as the feature amount, information indicating a smoothed graylevel of a stroke region in the neighboring region.

9. The image processing apparatus according to claim 8, wherein said feature extracting device extracts, as the information indicating the smoothed thickness, a graylevel value closest to black among graylevel values of pixels in a direction that passes through the target pixel and is perpendicular to the stroke region in the neighboring region.

10. The image processing apparatus according to claim 8, wherein said feature extracting device extracts, as the information indicating the smoothed thickness, an average of graylevel values of pixels in a direction that passes through the target pixel and is perpendicular to the stroke region in the neighboring region.

11. The image processing apparatus according to claim 1, wherein said separating device estimates a range, in which feature amounts of pixels in a stroke region to be deleted are distributed, based on information of a given ruled line frame, and separates the pixels belonging to the target stroke region by deleting pixels corresponding to the estimated range from the binary image of the plurality of stroke regions.

12. The image processing apparatus according to claim 1, wherein said separating device divides a distribution of feature amounts of pixels included in the binary image of the plurality of stroke regions into a plurality of distributions with clustering, and separates the pixels belonging to the target stroke region.

13. A computer readable medium encoded with a computer program, that when executed causes a computer to perform a method comprising:

extracting a plurality of stroke regions from a multilevel image, and generating a binary image of the plurality of stroke regions;

extracting a feature amount based on an attribute of a different pixel included in a neighboring region of a target pixel by using each pixel in each of the plurality of stroke regions as the target pixel; and separating pixels belonging to the target stroke region from the binary image of the plurality of stroke regions by using the extracted feature amount of each pixel, and generating a binary image of the target stroke region.

14. An image processing method, comprising:

extracting a plurality of stroke regions from a multilevel image, and generating a binary image of the plurality of stroke regions;

extracting a feature amount based on an attribute of a different pixel included in a neighboring region of a target pixel by using each pixel in each of the plurality of stroke regions as the target pixel; and separating pixels belonging to a target stroke region from the binary image of the plurality of stroke regions by using the extracted feature amount of each pixel, and generating a binary image of the target stroke region.

15. An image processing apparatus, comprising:

inputting means for inputting a multilevel image;

stroke extracting means for extracting a plurality of stroke regions from the multilevel image, and for generating a binary image of the plurality of stroke regions;

feature extracting means for extracting a feature amount based on an attribute of a different pixel included in a neighboring region of a target pixel by using each pixel in each of the plurality of stroke regions as the target pixel; and separating means for separating pixels belonging to a target stroke region from the binary image of the plurality of stroke regions by using the extracted feature amount of each pixel, and for generating a binary image of the target stroke region.

\* \* \* \* \*